(12) United States Patent
Willey

(10) Patent No.: US 7,865,565 B2
(45) Date of Patent: Jan. 4, 2011

(54) INPUT SHORTCUTS FOR A COMMUNICATIONS DEVICE

(75) Inventor: William Daniel Willey, Gilroy, CA (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/621,866

(22) Filed: Nov. 19, 2009

(65) Prior Publication Data

US 2010/0097403 A1    Apr. 22, 2010

Related U.S. Application Data

(63) Continuation of application No. 11/695,203, filed on Apr. 2, 2007, now abandoned.

(51) Int. Cl.
*G06F 15/16*    (2006.01)

(52) U.S. Cl. .............. 709/206; 709/227; 715/810; 715/205; 715/234; 715/261; 455/564; 455/466; 370/401; 370/474

(58) Field of Classification Search ............... 709/206, 709/227
See application file for complete search history.

(56) References Cited

U.S. PATENT DOCUMENTS

| | | | |
|---|---|---|---|
| 6,434,601 B1 | 8/2002 | Rollins | |
| 6,489,950 B1 | 12/2002 | Griffin et al. | |
| 2002/0149567 A1 | 10/2002 | Griffin et al. | |
| 2006/0010398 A1 | 1/2006 | Griffin | |
| 2006/0033718 A1 | 2/2006 | Griffin | |
| 2007/0110222 A1* | 5/2007 | Kim | 379/355.07 |
| 2007/0156747 A1 | 7/2007 | Samuelson | |
| 2008/0109445 A1* | 5/2008 | Williams et al. | 707/10 |

FOREIGN PATENT DOCUMENTS

WO    03/063128 A    7/2003

* cited by examiner

*Primary Examiner*—Jude J Jean Gilles
(74) *Attorney, Agent, or Firm*—Eckert Seamans Cherin & Mellott, LLC; Brij K. Agarwal, Esquire

(57) ABSTRACT

A method of inputting an electronic address into an address field on a communications device, the electronic address including a plurality of text characters and non-text symbol characters. The method includes: receiving a plurality of inputs for the address field through a user input interface of the device; adding text characters to the address field corresponding to the inputs; and detecting among the inputs repetitive successive inputs of a predetermined delimiter, selecting a non-text symbol character from a set of non-text symbol characters in dependence on a number of times the delimiter has been repetitively input without any intervening inputs, and adding the selected non-text symbol character to the address field.

22 Claims, 7 Drawing Sheets

INPUT SHORTCUTS FOR A COMMUNICATIONS DEVICE

CROSS-REFERENCE TO RELATED APPLICATIONS

The instant application is a continuation of U.S. patent application Ser. No. 11/695,203, filed Apr. 2, 2007, entitled "Input Shortcuts for a Communications Device," the contents of which are incorporated herein.

FIELD

Example embodiments described herein relate to communications devices and, in particular, to keyboard shortcuts for such devices.

BACKGROUND

Communications devices, in particular handheld mobile communications devices, typically have a keyboard or keypad for receiving input from a user. Such devices allow a user to be in contact through a communications network, for example the Internet, through various applications such as e-mail and web browsing. For mobile communications devices, the size of the device is typically small enough to be held in the users hand and worn on the body of the user, such as with a belt clip. Such devices may have keyboards with reduced size keys which provide for input by the user's thumbs, while the rest of the device may be physically carried by the hand and fingers. Since there is limited physical space on a mobile device, additional keys or features may not be easily accommodated on the keyboard.

One difficulty with using a keyboard, and especially a reduced size keyboard on a handheld mobile communications device, is that it is cumbersome to input special symbol characters into the device. For example, in a conventional QWERTY keyboard, the inputting of the ampersand or at-symbol (@) requires maintaining the pressing of a SHIFT key while subsequently pressing the "2" key. Such an action may be cumbersome for the user and may prove nearly impossible in some circumstances, e.g., when only one hand is free. Additionally, such an action is especially awkward when using a mobile device having reduced size keys.

Accordingly, input entry shortcuts are desirable.

BRIEF DESCRIPTION OF THE DRAWINGS

Example embodiments will now be described by way of example with reference to the accompanying drawings, through which like reference numerals are used to indicate similar features.

DETAILED DESCRIPTION

According to an example embodiment there is provided a method of inputting an electronic address into an address field on a communications device, the electronic address including a plurality of text characters and non-text symbol characters. The method includes: receiving a plurality of inputs for the address field through a user input interface of the device; adding text characters to the address field corresponding to the inputs; and detecting among the inputs repetitive successive inputs of a predetermined delimiter, selecting a non-text symbol character from a set of non-text symbol characters in dependence on a number of times the delimiter has been repetitively input without any intervening inputs, and adding the selected non-text symbol character to the address field.

According to another example embodiment, there is provided a hand-held wireless communications device that comprises a controller for controlling the operation of the device; a user input interface for inputting character information to the controller; a display coupled to the controller; and an electronic storage element coupled to the controller and having stored thereon a symbol character set comprising a sequence of non-text symbol characters. The controller inputs an address into an address field displayed on the display of the device by: (i) receiving a plurality of inputs for the address field through the user input interface; (ii) adding text characters to the address field corresponding to the inputs; and (iii) detecting repetitive successive inputs of a predetermined delimiter, selecting a non-text symbol character from the symbol character set in dependence on a number of times the delimiter has been repetitively input without any intervening inputs, and adding the selected non-text symbol character to the address field.

The following description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions, and other devices.

For clarity, reference to "symbol characters" refers to non-alphanumeric characters, and reference to "text characters" refers to all characters, including both symbol characters and alphanumeric characters.

Figure 1:
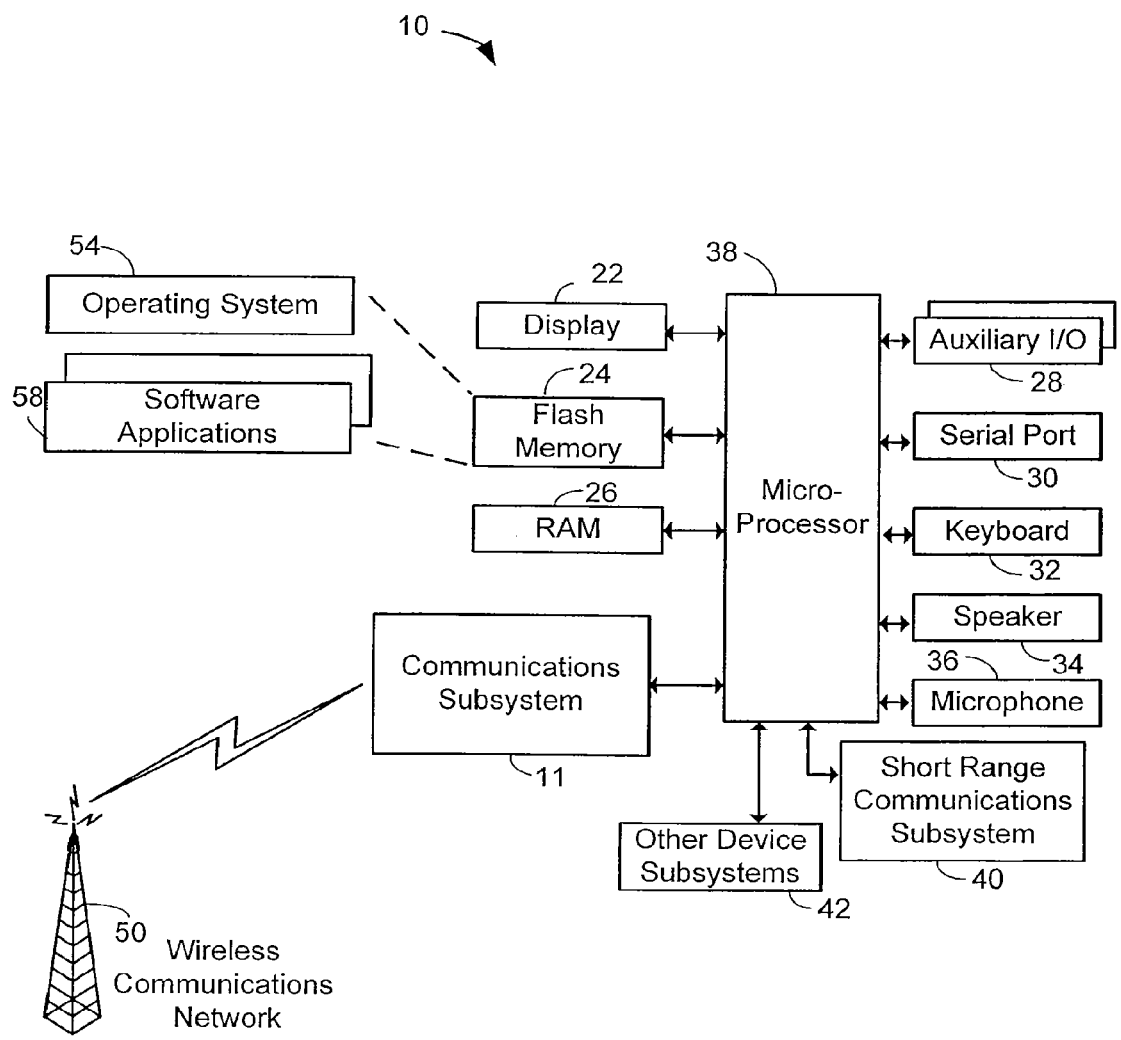
FIG. 1 shows a block diagram of an example of a mobile communications device to which example embodiments can be applied.

Referring now to the drawings, FIG. 1 is a block diagram showing an example of an electronic communications device 10 to which example embodiments described herein can be applied. The communications device 10 is a two-way mobile communication device having electronic messaging communications capabilities and possibly also voice communications capabilities. Depending on the functionality provided by the communications device 10, in various embodiments the communications device 10 may be a data communication device, a multiple-mode communications device configured for both data and voice communication, a mobile telephone, a PDA enabled for wireless communication, a computer system with a wireless modem or wireless network card, or a computer or phone device with a fixed connection to a network, among other things. The communications device 10 is in at least one example embodiment a handheld device having a casing or housing that is dimensioned to fit into a purse, pocket or belt-mounted device holster.

In the example embodiment shown in FIG. 1, the communications device 10 includes a communications subsystem 11 acting as the interface between the communications device 10 and the wireless communications network 50. Although not specifically shown in the Figures, the communications subsystem 11 may include one or more receivers, transmitters, and associated components such as one or more antenna elements, and a processing module such as a digital signal processor (DSP). As will be apparent to those skilled in the field of communications, the particular design of the communications subsystem 11 will be dependent upon the communication network(s) in which the communications device 10 is intended to operate.

The communications device 10 includes a controller that includes at least one microprocessor 38 for controlling the overall operation of the device. The microprocessor 38 interacts with the communications subsystem 11 and also interacts with further device subsystems such as a display 22, flash memory 24, random access memory (RAM) 26, one or more auxiliary input/output (I/O) subsystems or devices 28 (e.g. a scrollwheel 28a or trackball), serial port 30, keyboard or keypad 32, speaker 34, microphone 36, a short-range communications subsystem 40, and any other device subsystems generally designated as 42.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, in example embodiments enables execution of software applications 58 on the device. A predetermined set of software applications 58 which control basic device operations, including data and voice communication applications for example, will normally be installed on the communications device 10 during manufacture. Further software applications 58 may also be loaded onto the communications device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the communications device 10.

In a data communication mode, a received signal such as a text message or web page download will be processed by the communications subsystem 11 and input to the microprocessor 38, which further processes the received signal for output to the display 22, or alternatively to an auxiliary I/O device 28. A user of communications device 10 may also compose data items within the software applications 58, such as email messages, using the keyboard 32 in conjunction with the display 22 and possibly an auxiliary I/O device 28 (e.g. the scrollwheel 28a). Such composed items may then be transmitted and received over a communication network through the communications subsystem 11.

The serial port 30 (which may be for example a universal serial bus (USB) port) shown in FIG. 1 may enable a user to set preferences through an external device or software application and would extend the capabilities of the device by providing for information or software downloads to the communications device 10 other than through a wireless communication network.

The short-range communications subsystem 40 is a further component which may provide for communication between the communications device 10 and different systems or devices, which need not necessarily be similar devices. For example, the short-range communications subsystem 40 may include an infrared device and associated circuits and components or a Bluetooth™ communication module to provide for communication with similarly enabled systems and devices.

Wireless communications network 50 is, in an example embodiment, a wireless wide area packet data network, which provides radio coverage to mobile communications devices 10. Wireless communications network 50 may also be a voice and data network such as Global System for Mobile Communication (GSM) and General Packet Radio System (GPRS), Code Division Multiple Access (CDMA), or various other third generation networks such as Enhanced Data rates for GSM Evolution (EDGE) or Universal Mobile Telecommunications Systems (UMTS). In some example embodiments, wireless communications network 50 is a wireless local area network (WLAN), such as for example a network compliant with one or more of the IEEE 802.11 family of standards. In some example embodiments, the communications device 10 is configured to communicate in both data and voice modes over both wireless WAN and WLAN networks and to roam between such networks.

Figure 2:
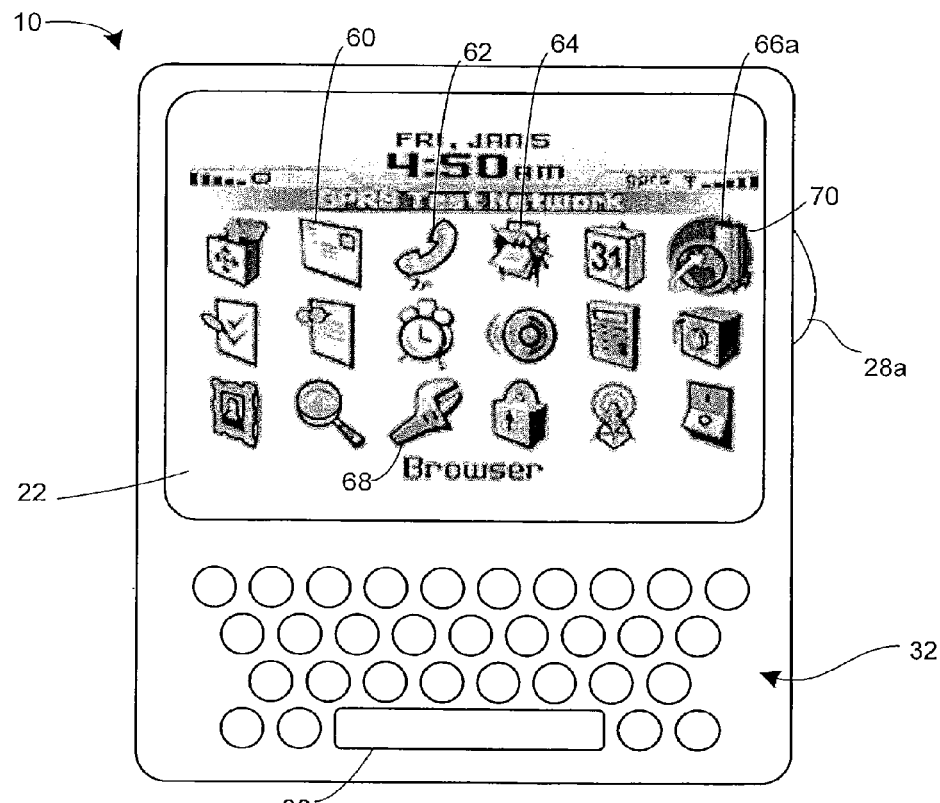
FIG. 2 illustrates a graphical representation of a front view of an example of the device of FIG. 1.

FIG. 2 shows, in diagrammatic form, a front view of an example handheld embodiment of the communications device 10 of FIG. 1. The communications device 10 includes display screen 22, alphanumeric keyboard or keypad 32 and rotatable input device such as a trackball or scrollwheel 28a. In some example embodiments, the keyboard 32 includes a QWERTY layout and includes space bar 33. In some example embodiments, each key in the keyboard 32 contains one or more letters aligned in a QWERTY layout. In some embodiments the keys in keyboard 32 may not be actual physical keys but may be virtual keys displayed on a touch screen display. In some example embodiments, the keyboard 32 includes a QWERTZ layout, an AZERTY layout, a Dvorak layout, or the like. In some example embodiments, the keyboard 32 layout has reduced keys, such as a reduced QWERTY layout.

Figure 3:
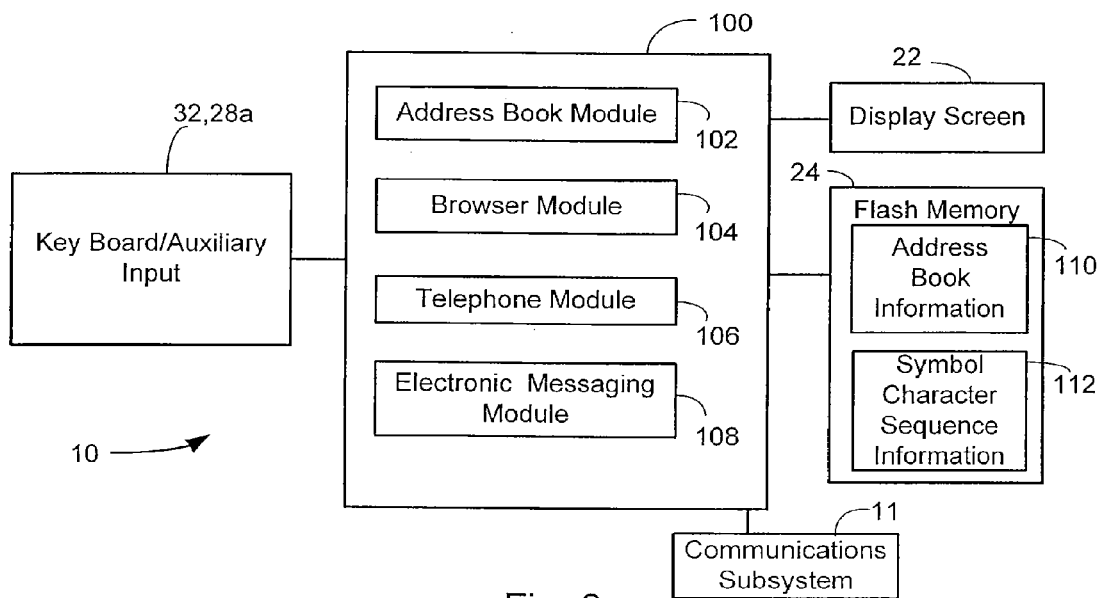
FIG. 3 shows a further operational block diagram representation of the mobile communications device of FIG. 1.

FIG. 3 shows a further operational block diagram representation of the mobile communications device 10 of FIG. 1. Also stored in a persistent storage of the communications device 10 (such as flash memory 24) is address book information 110 and symbol character sequence information 112. Such information may also be at least partially stored at least some of the time in memory of a Subscriber Identity Module (SIM) card (not shown) used with the communications device 10, in volatile device memory (such as RAM 26), and/or at a location accessible to the communications device 10 over wireless communications network 50. As will be described in greater detail below, symbol character sequence information 112 can be used in embodiments of the invention for facilitating input of special characters in address fields.

Under instructions from various software applications 58 shown in FIG. 1 and resident on the communications device 10, the processor 38 is configured to implement various functional components or modules 100, some of which are represented in FIG. 3, for interacting with the device subsystems described above. In an example embodiment, the software resident on the communications device 10 includes applications for implementing an address book module 102, a web browser module 104, a telephone module 106, and an electronic messaging module 108. In some embodiments, some or part of the functionality of the functional modules 100 can be implemented through firmware or hardware components instead of, or in combination with, computer software instructions executed by the microprocessor 38 (or other processors).

The electronic messaging module 108 enables the communications device 10 to send and receive messages, such as email messages, over one or more wireless communications networks 50. Examples of electronic messaging include email, personal identification number (PIN) messaging and/or short message service (SMS) messaging.

The address book module 102 enables address book information 110, such as telephone numbers, PIN numbers, email and/or instant text messaging addresses, to be stored and accessed on the communications device 10. The browser module 104 permits a user to access a specified web address, for example via data transfer over one or more wireless networks 50. The telephone module 106 enables the communications device 10 to transmit and receive voice and data over one or more wireless networks 50.

Referring to FIG. 2 again, there is shown an example of handheld communications device 10 on which a plurality of user selectable icons are shown on a display screen 22. The icons are each associated with functions that can be performed by the communications device 10. For example, FIG. 2 shows a "Messages" icon 60 for accessing electronic messaging functions of the communications device 10 (associated with electronic messaging module 108), a "Phone" icon 62 for accessing phone functionality (associated with telephone module 106), an "Address Book" icon 64 for accessing address book functions (associated with address book module 102), a browser icon 66a for accessing web browsing functions (associated with browser module 104), and an options icon 68 (associated with an options module, which may be a separate module or executed by one or more existing modules 100). As shown, the browser icon 66a is highlighted or focused by a caret or selection symbol 70 which can be navigated by a device user among the displayed icons through rotation of the scrollwheel 28a (or other navigational input device). The scrollwheel 28a is also depressible, such that depression of the scrollwheel 28a when an icon is highlighted or focused by selection symbol 70 results in launching of the underlying function.

Figure 5:
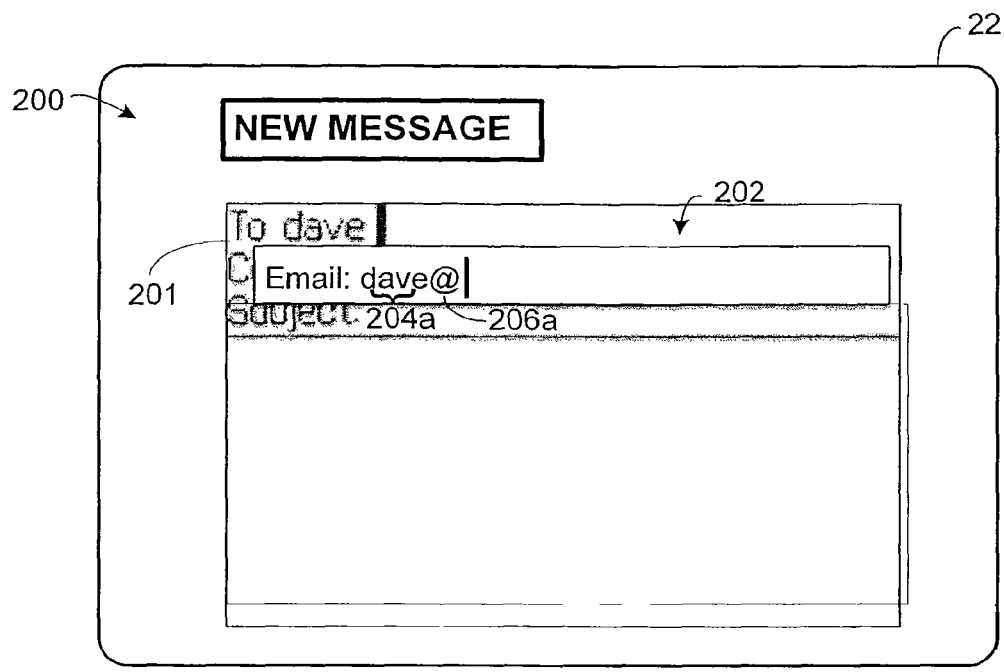
FIG. 5 shows an example of an e-mail composition user interface screen shown on a display of the device.
Figure 6:
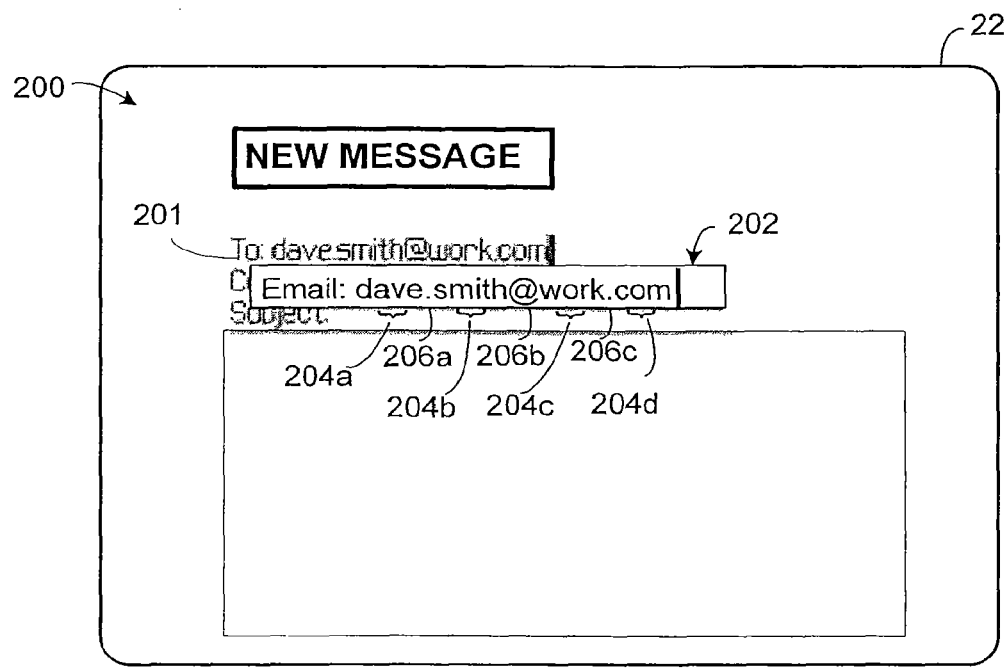
FIG. 6 shows the e-mail composition user interface screen of FIG. 5 with a completed e-mail address.
Figure 7:
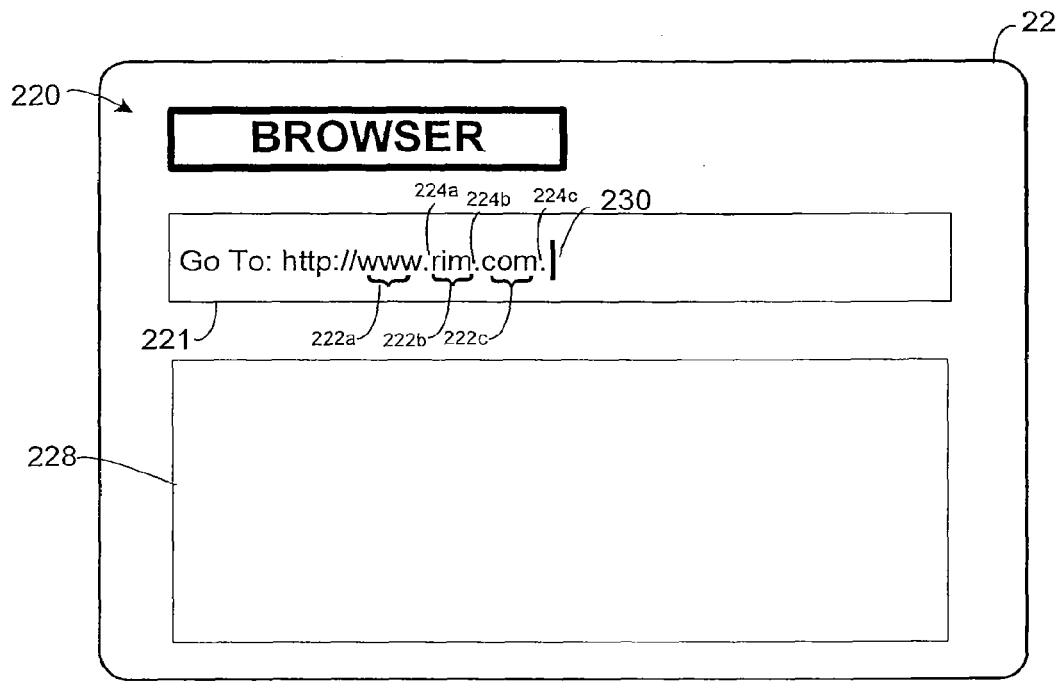
FIG. 7 shows an example of a web browser user interface screen shown on a display of the device.
Figure 8:
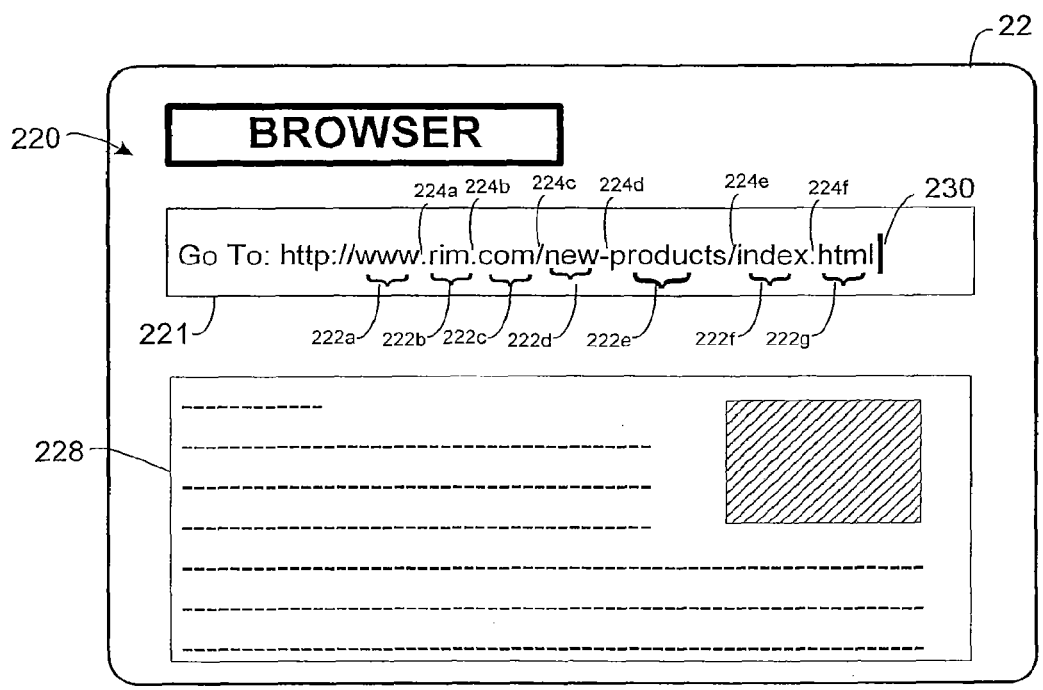
FIG. 8 shows the web browser user interface screen of FIG. 7 with a completed web address.

Generally, according to example embodiments, the communications device 10 is configured to facilitate the inputting of non-text symbol characters into an address field (see for example address field 202 in FIGS. 5 and 6 and address field 221 in FIGS. 7 and 8). Due to reduced size of the user input interface of a mobile communications device 10, such devices often do not have keys for special non-text symbol characters. If a user wishes to input an e-mail address for an e-mail application, there may be a number of symbol characters that may be required to be input. For example, typical e-mail address formats may be <name>@<domain>.com or <firstname>.<lastname>@<domain>.com. Furthermore, for example in web browser applications, a user may wish to input a desired web address or Uniform Resource Locator (URL) (for example, www.ABCcompany.com/world-wide/products.html). In such example applications, there may be a variety of different non-text symbol characters that may be required to be input into the appropriate address. A user may for example be required to input at symbols (@), period symbols (.), forward-slash symbols (/), hyphen symbols (-), underscore symbols (_), back-slash symbols (\), etc.

In addition, the first non-text symbol character that appears in an type of address may not always be the same. For example, with reference to the example e-mail addresses mentioned above, the first symbol character may be an at-symbol (@) in some instances, or a period symbol (.) in other instances, depending on the given address or the type of address format allocated by a domain owner (such as a company or service provider, etc.).

In example embodiments, the symbol characters may be selected from a set of symbol characters, wherein the set of symbol characters is in a specified sequence, as specified in symbol character sequence information 112. A user may enter text characters into the address field. The user may then wish to enter a symbol character. Upon input of a predetermined delimiter, for example a blank space (by user activation of the space bar key 33), a first symbol character is selected from the set of symbol characters. In example embodiments described herein, the blank space input is used as the delimiter as blank spaces are generally not valid characters in an electronic address field, however other predetermined delimiter input could be used. If a second blank space is inputted without a different key being depressed, this causes a second symbol character from the set of symbol characters to be selected. Each subsequent blank space causes a subsequent symbol character from the set of symbol characters to be selected, replacing any previous symbol characters. When a desired symbol character is selected, it may be appended to the text in the address field, and displayed on display screen 22.

Figure 4:
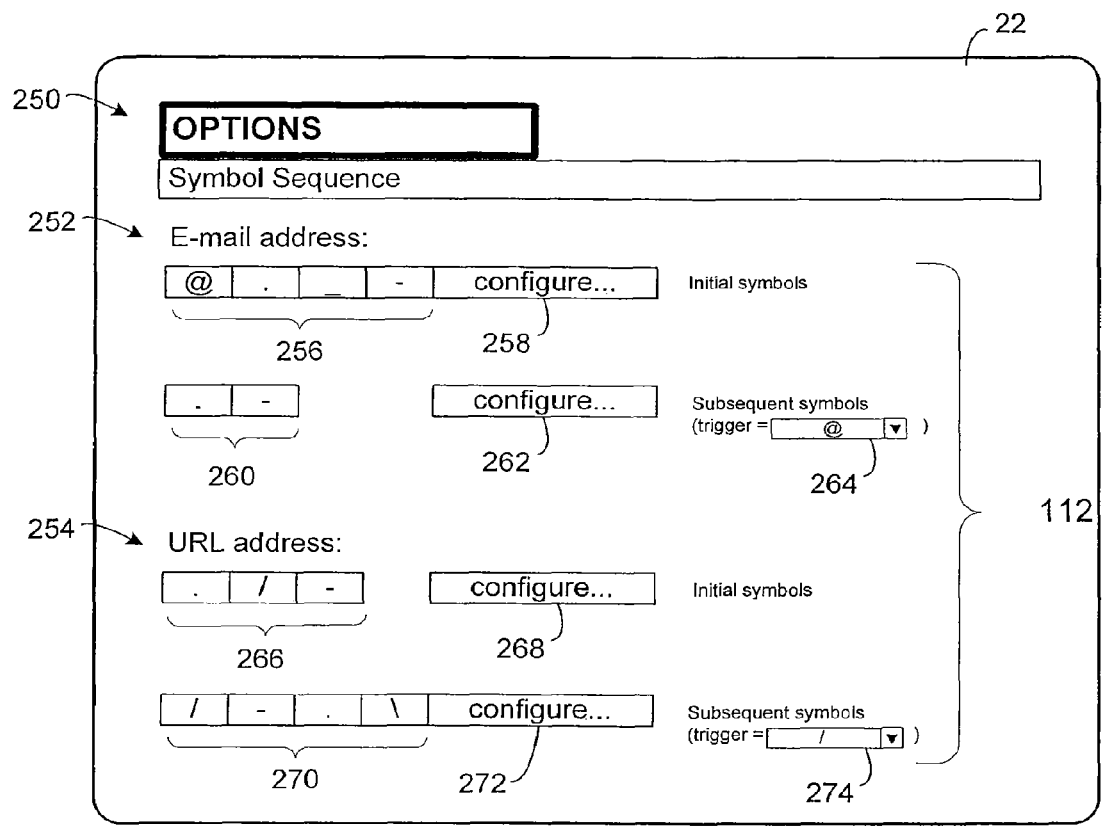
FIG. 4 shows an example of an options user interface screen shown on a display of the device of FIG. 1.
Figure 10:
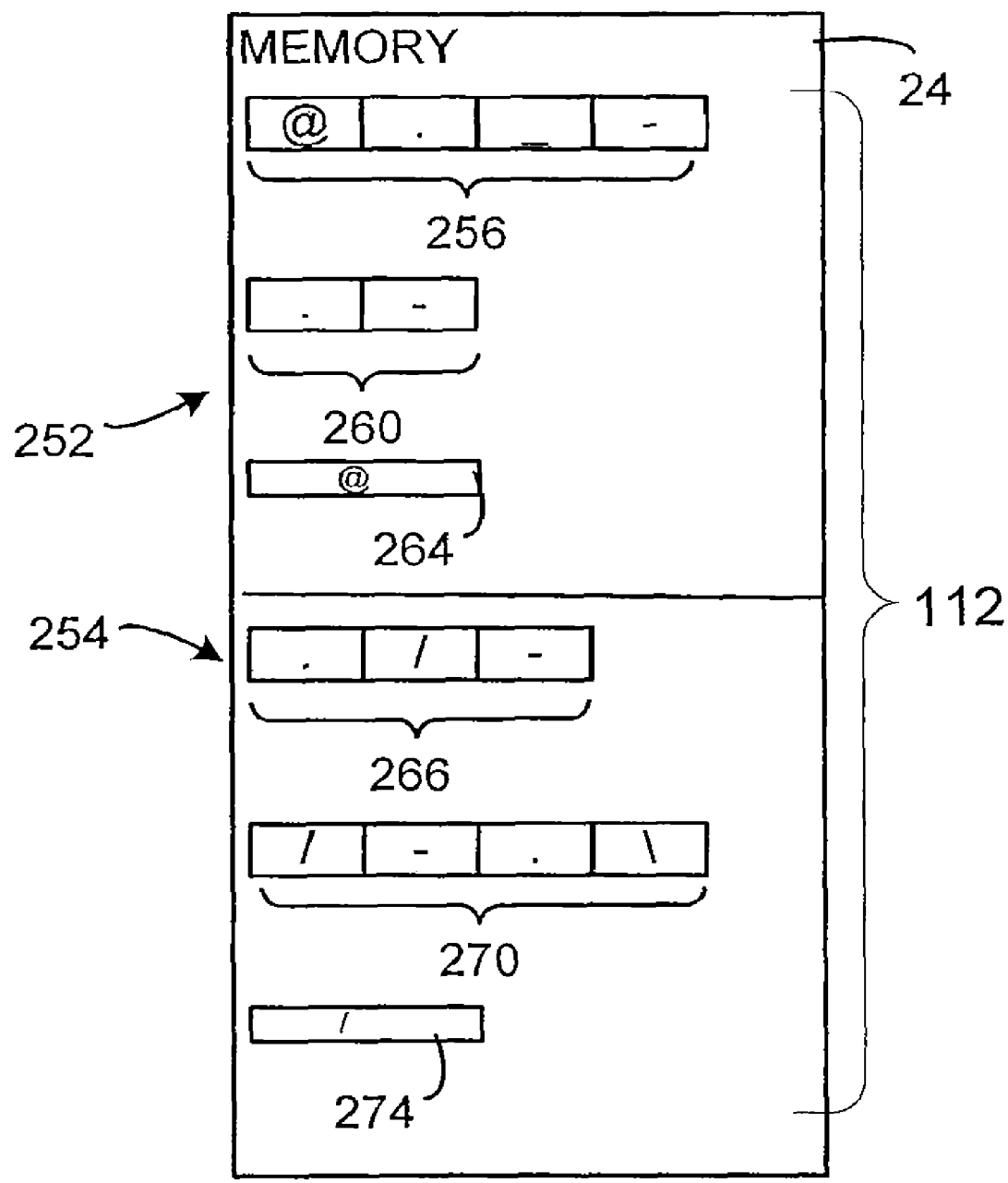
FIG. 10 shows an example of a data set used by a controller of the mobile communications device of FIG. 1.

To accomplish such embodiments, the symbol character sequence information 112 in flash memory 24 may be configured to contain a data structure as best illustrated in FIGS. 4 and 10. FIG. 4 illustrates representative symbol character sequence information 112 as displayed on an example options user interface screen 250 shown on the display 22 of the communications device 10. FIG. 10 represents the same information as stored in memory such as flash memory 24. Turning again to FIG. 4, the symbol character sequence information 112 may be configured to include multiple sets of symbol character sequences, where different sets are used depending on the type of electronic address that is being entered. Each symbol character set includes a predetermined sequence of symbol characters. Each set of symbol character sequences can in turn include sub-sets or groups of sequences. By way of example, in FIGS. 4 and 10 the symbol character sequence information 112 includes two symbol character sets, namely e-mail address set 252 for use when inputting an email address, and URL address set 254 for use when inputting a Uniform Resource Locator (URL) or World Wide Web (WEB) address. The e-mail address set 252 in turn includes two sub-sets or groups of symbol character sequences, namely an initial sequence group 256 (comprising the symbol sequence "@", ".", "_" and "-") and a subsequent sequence group 260 (comprising the symbol character sequence "." and "-"). The URL address set 254 also includes two sub-sets or groups of symbol character sequences, namely an initial sequence group 266 (comprising the symbol character sequence ".", "/", and "-") and subsequent sequence group 270 (comprising the symbol character sequence "/", "-", "." and "\").

Each of the symbol character sets 252, 254 can also have an associated trigger symbol character 264, 274. Trigger symbol characters 264, 274 permit the communications device 10 to recognize when a different group of symbol characters should be selected for inputting. For example, as shown in the illustrated embodiment, the trigger symbol character 264 for the email address set 252 is an "@" symbol, and the trigger symbol character 274 for the URL address set is a forward slash symbol (/).

Accordingly, in some example embodiments as illustrated in FIG. 4, the options user interface 250 allows a user to configure an e-mail address symbol character set 252 and a URL address symbol character set 254. In some example embodiments, the symbol character sets will be pre-configured with default symbols and may be subsequently changed through remotes access to the communications device 10 by a system administrator, for example. In other example embodiments, more or fewer symbol character sets could be provided, and the symbol character sets may each include more or less than two groups of sequences (and more trigger symbol characters in the case of more than two groups of sequences). Each set of symbol characters in each of the sequence groups 256, 260, 266, 270 is in a specified sequence, representing an order of selection preference of symbol characters with respect to specific example embodiments, as will be explained in greater detail below.

By way of example only, with respect to the e-mail set 252, and referring to the initial group 256, the specified symbol character sequence in that instance is shown as an at symbol (@), a period symbol (.), an underscore symbol (_), and a hyphen symbol (-). Referring to the subsequent group 260 of symbol characters 260, the specified sequence in that instance is shown as a period symbol (.) and a hyphen symbol (-). With respect to the URL address set 254, referring to the initial group 266 of symbol characters, the specified sequence in that instance is shown as an period symbol (.), a forward-slash symbol (/), and a hyphen symbol (-). Referring to the subsequent group 270 of symbol characters, the specified sequence in that instance is shown as a forward-slash symbol (/), a hyphen symbol (-), a period symbol (.), and a back-slash symbol (\). Other sets of symbol characters can be specified and the particular sequences set out above are merely illustrative. In some embodiments, all or part of the symbol character sequence information 112 may be hard coded in one or more software applications, rather than for example a user configurable data set stored in memory.

Example embodiments are illustrated in the e-mail user interface 200 of FIGS. 5 and 6. The user interface 200 may be used to compose a message, for example an e-mail message. As shown in FIGS. 5 and 6, in some example embodiments, the e-mail user interface 200 may have a header 201 in the interface, that includes a "To" field, a "CC" field, and a "Subject" field. In some example embodiments, as shown, the "To" field in the user interface 200 may have an e-mail address field 202 for inputting of a recipient e-mail address. In some example embodiments, as shown, the e-mail address field 202 may be populated with a plurality of text characters 204a-204d and a plurality of symbol characters 206a-206c. By way of example only, as shown, the desired e-mail address to be input into the e-mail address field is "dave.smith@work.com".

In operation, again referring to FIG. 5, a user may wish to input an e-mail address into the e-mail address field 152, for example "dave.smith@work.com". The user begins by entering the text characters "dave" 204a into the address field 202. A user may then wish to append the text characters 204a with a symbol character. If the user enters a predetermined delimiter, such as a blank space (a "first blank space"), for example by pressing space bar 33, the communications device 10 selects the first symbol character in the initial group of symbol characters 256 and displays that character in the address field 202. Referring to FIG. 4, the first symbol character in the initial group of symbol characters 256 is the "@" symbol. Thus, by inputting a first blank space into the address field, the "@" symbol is selected from the initial group of symbol characters 256, as represented by the symbol character at "@" at location 206a in FIG. 5. If the user once again inputs the predetermined delimiter, for example another blank space (i.e. a second blank space) before entering another text character, a second symbol character is selected from the initial group of symbol characters 256 in place of the first symbol character. Referring again to FIG. 4, the second symbol character from the initial group of symbol characters 256 is a period symbol (.). Thus, by pressing the space bar 33 a second time without any intervening character input after pressing the space key the first time, the period symbol (.) is selected from the initial group of symbol characters 256, and inserted into the text of address field 202 instead of the "@" symbol, as represented by the period "." symbol at location 206a in FIG. 6. If a blank space is entered for a third or fourth time (before entering any other text characters), subsequent symbol characters will be selected from the initial group of symbol characters 256. If a blank space is entered for a fifth time, in some example embodiments, the first symbol, i.e., the "@" symbol, is once again selected from the initial group of symbol characters 256. Accordingly, in some example embodiments, a user may repeatedly press the space key to cycle through the set of symbol characters. When the user gets to the last symbol in the sequence 256, the sequence then starts again with the first symbol.

Continuing with the example shown in FIG. 6, a user may enter the text characters "smith" 204b. A user may then input a blank space, for example by pressing the space bar 33 once only, which will select the "@" symbol for location 206b. The blank space is only input once in the illustrated example, so the first symbol character "@" in the initial group of characters 256 is selected and displayed on the communications device 10. The user may then enter the text characters "work" 204c.

As indicated in FIG. 4, the trigger symbol 264 may be an "@" symbol. If the e-mail address field 202 contains a trigger symbol, this means that the set of symbol characters will be selected from a second set of symbol characters, rather than an initial group of symbol characters. Thus, referring again to FIG. 6, if a user enters a blank space at symbol character location 206c, the communications device 10 checks whether the address field 202 contains the trigger symbol (an at symbol (@)). It will be appreciated that in different embodiments, the communications device 10 could use different methods to determine if the trigger symbol 264 was already present in the address field 202. For example, the entire address field 202 can be scanned with each input to determine if the trigger symbol is present; a flag could be set when the trigger symbol 264 is added to the address field 202; or a state machine could be used to track if the trigger symbol 264 has been added. In the illustrated embodiment, since the trigger symbol 264, namely the at symbol (@), is present (at 206b), the communications device 10 selects the first symbol character from the subsequent group of symbol characters 260, rather than the initial group of symbol characters 256. As shown in FIG. 4, the first symbol character in the subsequent group of symbol characters 260 is a period symbol (.). Thus, by inserting a blank space once, for example by pressing the space bar 33 once only, a period (.) is selected and subsequently inserted (see location 206c) after the text characters 204c into the address field 202. Continuing with the example shown in FIG. 6, a user may enter the text characters "com" 204d. The user has now completed the entering of the desired e-mail address text into the address field 202.

In some example embodiments, as illustrated in FIG. 5, the selected symbol character is actively displayed immediately upon user activation of the space key on the screen 22. Thus, when a blank space is input once, an "@" symbol is displayed on the screen at location 206a (e.g., FIG. 5). When a blank space is repeatedly input for a second time, a period symbol (.) replaces the "@" symbol displayed on the screen at location 206a (e.g., FIG. 6). The presently selected symbol character will be appended to the address field when the user inputs a different text character or presses some other input (e.g., by depressing scrollwheel 28a). In other example embodiments, the presently selected symbol character is not displayed on the screen 22, and only the final desired symbol is appended to the address field, depending on the number of times the blank space is inputted.

In some example embodiments, the presently selected symbol character flashes on the screen 22 (or some other visual indicator is used) to indicate that another inputting of a blank space will select a subsequent symbol character in a set of symbol characters. The subsequent symbol character replaces any preceding symbol characters. If the presently selected symbol character is the desired symbol character, the user may input a different text character or press some other input (e.g., by depressing scrollwheel 28a). Once the desired symbol character is selected, the symbol character will stop flashing and be appended to the address field.

It can be appreciated that the example embodiments of FIGS. 5 and 6 may be incorporated in a variety of applications which include e-mail address fields. For example, in an address book application performed by address book module 102, a user may wish to input an e-mail address into an e-mail address field, to be saved for future correspondence with a specified individual. In such an instance, when a user is inserting text characters into the e-mail address field, the user may press the space bar 33, for a particular number of times, in order to select a desired symbol character.

Reference is now made to FIGS. 7 and 8, which show an example of a web browser user interface 220 shown on the display 22. The user interface 220 may be used to input a desired web address, for accessing a webpage over the wireless networks 50, which may include the Internet. In some example embodiments, as shown, the user interface 200 may have a web address field 221 for inputting of a desired Uniform Resource Locator (URL), and a browser window 228 for displaying of an associated web page. In some example embodiments, as shown, the web address field 221 may be populated with a plurality of text characters in text fields 222 and a plurality of symbol characters 224. By way of example only, as shown, the desired web address to be input into the web address field is "www.rim.com/new-products/index.html". Also shown is in the web address field 221 is a cursor 230.

In some example embodiments, the preceding text "Go To: http://" is automatically generated. The preceding text may or may not form part of the web address field 221, depending on the application or configuration of the communications device 10.

In operation, again referring to FIG. 7, a user may wish to input a web address into the web address field 221, for example "www.rim.com/new-products/index.html". The user begins by entering the text characters "www" 222a into the address field 221. A user may then wish to append the text characters 222a with a symbol character. Referring to FIG. 4, the first symbol character in the initial group of symbol characters 266 is a period symbol (.). Thus, by inputting a first blank space into the address field 221, the period symbol (.) is selected from the initial group of symbol characters 266, and inserted into the text of web address field 221, as shown by symbol character 224a in FIG. 7.

Continuing with the example, with reference to FIG. 7, a user may enter the text characters "rim" 222b. A user may then input a blank space, for example by pressing the space bar 33 once only, which will again enter the period symbol (.) 224 into the web address field 221. Since the blank space is only entered once, the first symbol character, namely the period symbol (.), in the initial group of characters 266 is selected and displayed on the communications device 10. A user may enter the text characters "com" 222c.

Continuing with the example, a user may then enter a single blank space, whereby the communications device 10 selects the first symbol character, namely the period symbol (.), from the initial group of symbol characters 266. If the user inputs a second blank space without any intervening key selections, a second symbol character is selected from the initial group of symbol characters 256, namely the forward-slash symbol (/). Thus, by inputting a second blank space into the address field, the forward-slash symbol (/) is selected from the initial group of symbol characters 266, and inserted into the text of web address field 221 at location 224c (FIG. 8). If a blank space is entered for a third or fourth time (before entering any other text characters), the subsequent respective symbol characters will be selected from the initial group of symbol characters 266. If a blank space is entered for a fifth time, in some example embodiments, the first symbol, i.e., the period symbol (.), is once again selected from the initial group of symbol characters 266.

Continuing with the example, with reference to FIG. 8, a user may enter the text characters "new" 222d. As indicated in FIG. 4, the trigger symbol 274 may be a forward-slash symbol (/). If the web address field 221 contains a trigger symbol, this means that the set of symbol characters will be selected from a second set of symbol characters 270, rather than an initial group of symbol characters 266. Note that the preceding text "Go To: http://" would not be considered as part of the address field when determining the presence of the trigger symbol. Thus, referring again to FIG. 8, if a user enters a blank space at location 224d, the communications device 10 checks whether the web address field 221 contains the trigger symbol (a forward-slash symbol (/)). Since the trigger symbol, namely the forward-slash symbol (/), is present (at location 224c), the communications device 10 selects the first symbol character from the subsequent group of symbol characters 270, rather than the initial group of symbol characters 266. As shown in FIG. 4, the first symbol character in the subsequent group of symbol characters 260 is a forward slash symbol (/). If a second blank space is inputted, the communications device 10 selects the second symbol character from the subsequent group of symbol characters 270, namely the hyphen symbol (-). Thus, by inserting a second blank space, a hyphen symbol (-) is selected and subsequently inserted after the text characters 222d into the address field 221.

Continuing with the example, with reference to FIG. 8, a user may enter the remaining text "products/index.html" in the same manner as described above. In some example embodiments, a web page may then be associated with the address, for example by directing the web page to an internet protocol (IP) address, for downloading of the associated web page, for example from wireless networks 50. The downloaded web page may then be displayed in browser window 228.

It can be appreciated that the example embodiments of FIGS. 7 and 8 may be incorporated in a variety of applications which include web address fields. For example, there may be a bookmark application associated with the web browser module 104. A bookmark is typically saved as an entire web address in a given application, and by selecting the bookmark, a user is not required to type in the entire web address for accessing of a desired web page. A user may initially be required to type in a web address into the bookmark application. In such an instance, a user would for example be inputting text characters into a web address field, and pressing the space bar 33, for a particular number of times, in order to select a desired symbol character.

Figure 9:
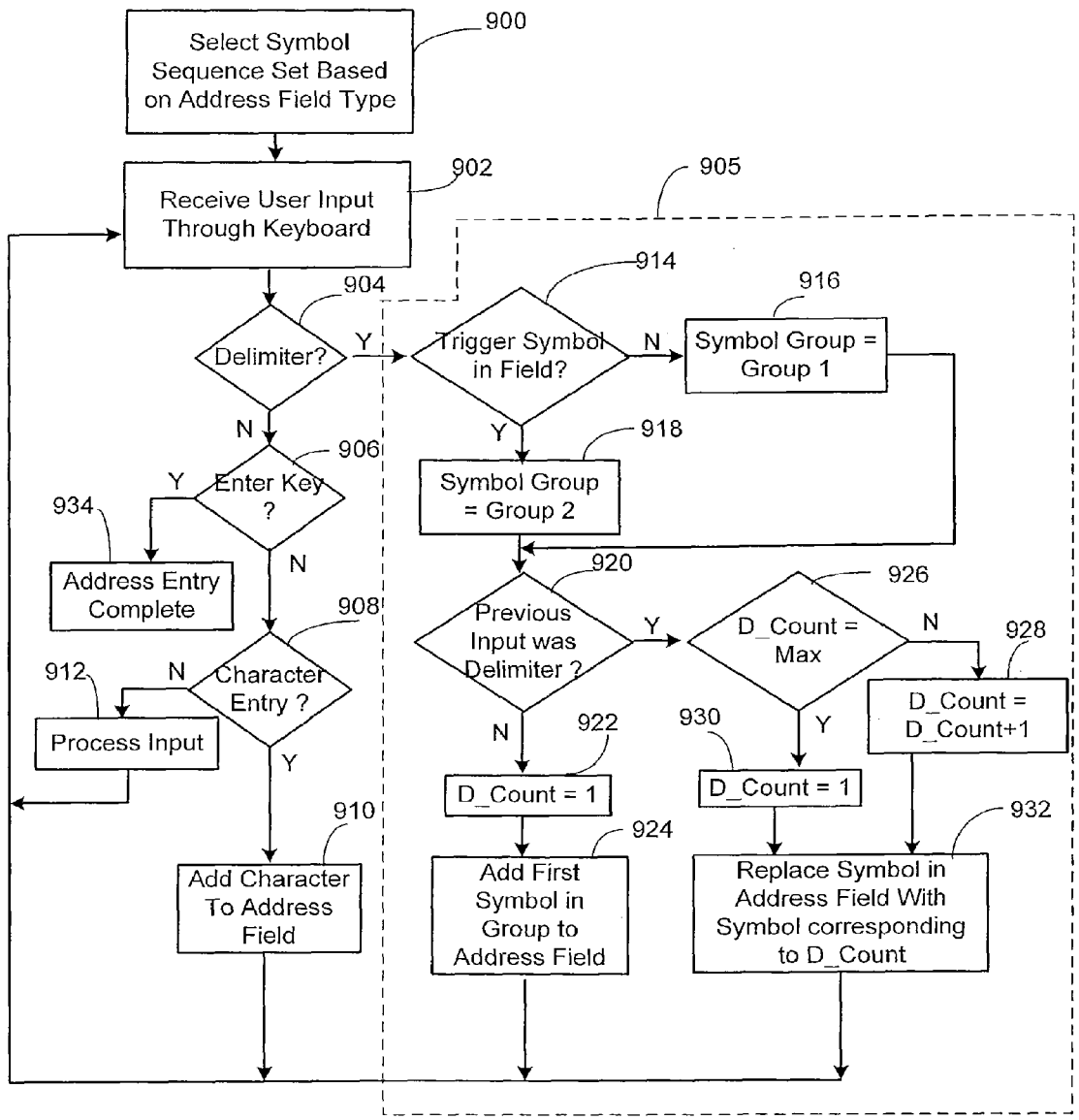
FIG. 9 shows a flow diagram of a method performed by a controller of the mobile communications device of FIG. 1.

FIG. 9 shows a flow diagram illustrating an example method performed by the microprocessor 38 of the communications device 10 to implement the functionality described above in respect of FIGS. 5-8. In example embodiments, the microprocessor 38 may perform such method under control of computer instructions that can be associated with one or more of the operating system 54 and the software applications 58 used to implement modules 100, including for example the software associated with browser module 104 and messaging module 108. The exact order of steps may vary from those shown in FIG. 9 in different applications and embodiments. It can also be appreciated that some steps may not be required in some embodiments.

Referring now to the method of FIG. 9 and the example symbol character sequence information 112 as shown in FIG. 10, the communications device 10 may be configured to perform the example method as illustrated. The method of FIG. 9 commences when an input location marker such as a cursor is located within an electronic address entry field 202, 221 displayed on the device display 22 for which the communications device 10 is configured to implement the method of FIG. 9. As indicated above, examples of electronic address entry fields can include, but are not limited to, e-mail address and World Wide Web or URL addresses. In some example embodiments, the method begins with step 900, in which a suitable symbol set (for example, email address set 252 or URL address set 254) to use for the remainder of the method is automatically selected based on the type of address field in which the input is occurring. In some embodiments, set selection may not be required as the only one set may be available to the specific application that is used to implement address entry.

As indicated at step 902, a user input through the keyboard 32 or other input device is then received. As indicated in steps 904, 906, and 908, respectively, the communications device 10 is configured to detect if a predetermined delimiter is inputted by the user (step 904), if a predetermined enter key is inputted (step 906), or if a normal character is entered (step 908). Typically, the first few user inputs in an address field 202 or 221 will be text characters, with each input text character being added to the address field 202 or 221 (both in memory and in the on-screen display) as they are input, as indicated at step 910. After each input character is added to the address field 202 or 221, the method returns to step 902 to receive the next user input.

In the event that the user inputs a predetermined delimiter at step 902 (for example, presses or selects the space key to input a space character) then a delimiter processing method 905 is performed. As indicated by steps 914, 916 and 918, in example embodiments where the current symbol set 252 (or 254, as the case may be), includes multiple groups, a determination whether the predetermined trigger symbol (for example the "@" symbol for a email address, the "/" symbol for a URL address) has already been input into the address field. If not, as indicated at step 916 the communications device 10 will select the initial or first symbol group (for example, initial group 256 in the case of an email address, and initial group 266 in the case of a URL address) as the symbol group to use when selecting a symbol for entry into the address field. As indicated at step 918, if the predetermined trigger symbol has already been input into the address field, the communications device 10 will select the subsequent or second symbol group (for example, subsequent group 260 in the case of an email address, and subsequent group 270 in the case of a URL address) to use when selecting a symbol.

As indicated at step 920, the device then determines if the delimiter input is a repeat input by determining if the most recent previous user input was a delimiter. If the most recent user input was not a delimiter input, then a counter (D-Count) is set to indicate that it is the first entry of a delimiter at the current location in the address field, and the first symbol character from the selected symbol character group is added to the address field (both in memory and on the display screen) at the current input location in the field (step 924), and the device then loops back to step 902 to wait for the next user input.

In the event that at step 920 a determination is made that the delimiter input is in fact a repeat input (for example, when the space key has been repeatedly pressed without any intervening user keyboard inputs), then the counter (D-Count) is incremented (step 928). As indicated at steps 926 and 930, in the event that the counter D-Count is at a maximum value that corresponds to the total number of symbol characters in the currently selected symbol character sequence group, then the counter is re-set to allow for cycling through the symbol group. As indicated in step 932, when a delimiter input is a repeat input (without any intervening inputs) the symbol character that was previously placed in the address field at step 924 during the previous iteration through process 905 is replaced in memory and on the display screen with the symbol from the symbol group that corresponds to the value of the counter D_Count. For example, in the case of initial symbol character group 256, D_Count=1 corresponds to the symbol "@"; D_Count=2 corresponds to "."; D_Count=3 corresponds to "_" and D_Count=4 corresponds to "-", and Max=4.

Turning to step 906, user input such as pressing an enter key or other selection input (for example depressing a scroll wheel or trackball) can signal that address entry is complete (step 934) in some embodiments. Turning again to step 908, in the event that the user input is not a delimiter, an enter key, or an appropriate character, the input will be suitably processed as indicated at step 912.

As will be apparent from the above description, in at least one example embodiment, when the user hits space bar for the first time in an email address, an "@" will be inserted. If the user hits the spacebar a second time without hitting any other key, the "@" would be replaced by a ".". If the user hit the spacebar a third time without hitting any other key, the "." would be replaced by a "_". Hitting the spacebar 33 a fourth time without hitting any other key would result in the "_" being replaced by a "-". After the user types another character after the "@" in an email address and then presses space, a "." would be inserted. Pressing the spacebar 33 a second time without hitting any other key would result in the "." being replaced with a "-". Subsequent presses of the spacebar 33 without hitting another key would toggle between "-" and "." since they are the only valid special symbol characters in a domain name.

When the user hits the space bar for the first time in a URL, a "." will be inserted. If the user hits the spacebar a second time after typing "." without hitting any other key, the "." would be replaced by a "/". If the user hits the spacebar a second time without hitting any other key, the "/" would be replaced by a "-". After the first alphanumeric character after a "/" (trigger symbol) in a URL, pressing the space would generate a "/" character (from sequence 270), and so on.

It will be appreciated that the symbol input shortcut functionality described above could be implemented in a number of ways, and the flow chart shown in FIG. 9 is merely illustrative of one possible implementation.

Reference is again made to FIGS. 4 and 10, which illustrate example embodiments of possible options and configurations of the set(s) of symbol characters. The choice of the set(s) of symbol characters may depend on the conventional uses of the various address, which may vary over time. The choice of the set(s) of symbol characters may for example be based on frequency studies of use by a sample group, industry standards, conventions, and statistical usage. In some example embodiments, the choice of the set(s) of symbol characters may be configured by the manufacturer or system administrator of a company, and in other embodiments by a user's preference, for example by selecting configuration icons 258, 262, 268, 272 (shown in FIG. 4). In some example embodiments, the configuration of the set(s) of symbol characters may be password protected. The choice of the trigger symbol characters 264 or 274 may also be configured by selecting drop-down menus. The trigger symbol character may also vary based on frequency studies of use by a sample group, industry standards, conventions, and statistical usage.

The choice of symbol characters will now be explained, by way of example only, with respect to the e-mail address menu 252. In some example embodiments, the initial group of symbol characters 256 is, in order, the at symbol (@), the period symbol (.), the underscore symbol (_), and the hyphen symbol (-). However, as mentioned, the choice of symbol characters and the order may vary over time, depending on the particular application. In some example embodiments, the at symbol (@) is typically the first symbol character in an e-mail address. However, as illustrated above, some e-mail addresses do have the period symbol (.) as the first symbol character.

The at symbol (@) is also chosen as the trigger symbol character, because the types of symbol characters typically used after the at symbol (@) vary with respect to those before the at symbol. For example, in some applications, it is considered an invalid address to have two at symbols (@) in the same e-mail address, and thus a subsequent at symbol (@) would never be used in such applications.

Again referring to the e-mail address character sequence set 252 of FIG. 4, in some example embodiments, the subsequent group of symbol characters 260 is, in order, the period symbol (.) and the hyphen symbol (-). Thus, when a user inserts a blank space in an address field, the symbol character will toggle between the period symbol (.) and the hyphen symbol (-). These symbol characters were chosen because, in some applications, they are the only valid symbol characters in a domain name (i.e., after the at symbol (@)).

Referring now to the URL address character sequence set 254 of FIG. 4, in some example embodiments, the initial group of symbol characters 266 is, in order, the period symbol (.), the forward-slash symbol (/) and the hyphen symbol (-). However, as mentioned, the choice of symbol characters and the order may vary over time, depending on the particular application. In some example embodiments, the period symbol (.) is typically but not always the first symbol character in a web address, i.e., www.[companyname].com.

The forward slash symbol (/) is chosen as the trigger symbol character, because the types of symbol characters typically used after the forward slash symbol (/) vary with respect to those before the at symbol.

Again referring to the URL address menu 254, in some example embodiments, the subsequent group of symbol characters 270 is, in order, the forward-slash symbol (/), the hyphen symbol (-), the period symbol (.), and the backslash symbol (\). The choice of symbol characters may vary, as explained above.

It can be appreciated that each set of symbol characters may contain more or less than the 2, 3 or 4 symbol characters shown in the example embodiments. It can also be appreciated that multiple trigger symbols may be used, with possibly more than 2 sets of symbol characters for any given type of address. In addition, the choice of symbols is not limited to those mentioned in the above example embodiments, which are meant to be illustrative only.

In the embodiments described above, a trigger symbol 264, 274 permits the communications device 10 to recognize when a different group of symbol characters (e.g. group 256 or group 260 in the case of an email address; group 266 or group 270 in the case of a URL) should be used for inputting a special symbol in response to a space character input. In at least some example embodiments, trigger character strings are used in place of a trigger character to determine which group of symbols should be used. By way of example, in the context of a URL address, trigger strings could include common top level domain names such that the communications device 10 is configured to determine at step 914 (or through state machine) if one or more of the trigger strings ".com", ".net", ".org", ".gov", ".biz", ".ca", ".uk" or other top-level domain (TLD) is present in the address field. The first group of special symbol characters 266 (step 916) can be used for special symbol input if the trigger string is not present in the address field, and the second group of special symbol characters 270 (step 918) used for special input symbol input if the trigger string is present in the address field.

While the invention has been described in detail in the foregoing specification, it will be understood by those skilled in the art that variations may be made without departing from the scope of the invention, being limited only by the appended claims.

What is claimed is:

1. A method of inputting an electronic address into an address field on a communications device, the electronic address including a plurality of text characters and non-text symbol characters, comprising:

receiving a plurality of inputs for the address field through a user input interface of the device;

adding text characters to the address field corresponding to received inputs that are text character inputs; and detecting among the inputs repetitive successive inputs of a predetermined delimiter, selecting a non-text symbol character from a set of non-text symbol characters in dependence on a number of times the delimiter has been repetitively input without any intervening inputs, and adding the selected non-text symbol character to the address field when an input other than the delimiter is received.

2. The method of claim 1 wherein the delimiter is a space character input.

3. The method of claim 1 wherein the selected non-text symbol character is selected both in dependence on the number of times the delimiter has been repetitively input without any intervening inputs and whether a predetermined symbol character is already present in the address field.

4. The method of claim 3 wherein the set of non-text symbol characters includes a first sequence of symbol characters and a second sequence of symbol characters, wherein the selected symbol character is selected from the first sequence if the predetermined symbol character is not already present in the address field, and the selected symbol character is selected from the second sequence if the predetermined symbol character is already present in the address field.

5. The method of claim 4 wherein the address field is an email address field and the predetermined symbol character is an "@" symbol character.

6. The method of claim 5 wherein the set of non-text symbol characters includes symbol characters selected from the group consisting of the symbol characters "@", ".", "_" and "-".

7. The method of claim 6 wherein if the predetermined symbol character is not already present in the address field, one input of the delimiter causes the "@" symbol character to be selected as the selected symbol character, and two repetitive inputs of the delimiter without any intervening inputs causes the "." symbol character to be selected as the selected symbol character.

8. The method of claim 4 wherein the address field is a WEB address field and the predetermined symbol character is an "/" symbol character.

9. The method of claim 8 wherein the set of non-text symbol characters includes symbol characters selected from the group consisting of the symbol characters ".", "_" and "-".

10. The method of claim 1 wherein the set of non-text symbol characters includes a first sequence of symbol characters and a second sequence of symbol characters, wherein the selected symbol character is selected from the first sequence if a predetermined character string is not already present in the address field, and the selected symbol character is selected from the second sequence if the predetermined character string is already present in the address field.

11. The method of claim 1 wherein a plurality of different predetermined sets of non-text symbol characters are stored on the communications device, the method comprising choosing a specific one of the sets in dependence on a type of the address field, wherein the selected non-text symbol character is selected from the chosen set.

12. A computer program product for inputting an electronic address into an address field on a communications device, the electronic address including a plurality of text characters and non-text symbol characters, the product comprising a computer readable medium embodying instructions enabling a processor to perform the method of claim 1.

13. A hand-held wireless communications device, comprising:
 a controller for controlling the operation of the device;
 a user input interface for inputting character information to the controller;
 a display coupled to the controller; and
 an electronic storage element coupled to the controller and having stored thereon a symbol character set comprising a sequence of non-text symbol characters,
 the controller inputting an address into an address field displayed on the display of the device by: (i) receiving a plurality of inputs for the address field through the user input interface; (ii) adding text characters to the address field corresponding to received inputs that are text character inputs; and (iii) detecting repetitive successive inputs of a predetermined delimiter, selecting a non-text symbol character from the symbol character set in dependence on a number of times the delimiter has been repetitively input without any intervening inputs, and adding the selected non-text symbol character to the address field when an input other than the delimiter is received.

14. The device of claim 13 wherein the delimiter is a space character input.

15. The device of claim 13 wherein the symbol character set includes a first sequence of symbol characters and second sequence of symbol characters, wherein the selected symbol character is selected from the first sequence if a predetermined symbol character is not already present in the address field, and the selected symbol character is selected from the second sequence if the predetermined symbol character is already present in the address field.

16. The device of claim 15 wherein the address field is an email address field and the predetermined symbol character is an "@" symbol character.

17. The device of claim 16 wherein the set of non-text symbol characters includes symbol characters selected from the group consisting of the symbol characters "@", ".", "_", and "-".

18. The device of claim 15 wherein the address field is a WEB address field and the predetermined symbol character is an "/" symbol character.

19. The device of claim 18 wherein the set of non-text symbol characters includes symbol characters selected from the group consisting of the symbol characters ".", "_" and "-".

20. The device of claim 12 wherein a plurality of different predetermined symbol character sets of non-text symbol characters are stored on the storage element, the controller choosing a specific one of the symbol character sets in dependence on a type of the address field, wherein the selected non-text symbol character is selected from the chosen symbol character set.

21. A method of inputting an electronic address into an address field on a communications device, the electronic address including a plurality of text characters and non-text symbol characters, comprising:
 receiving a plurality of inputs for the address field through a user input interface of the device;
 adding text characters to the address field corresponding to received inputs that are text character inputs; and
 detecting among the inputs repetitive successive inputs of a predetermined delimiter, selecting a non-text symbol character from a set of non-text symbol characters in dependence on a number of times the delimiter has been repetitively input without any intervening inputs, and adding the selected non-text symbol character to the address field when an input other than the delimiter is received,
 wherein the set of non-text symbol characters includes a first sequence of symbol characters and a second sequence of symbol characters, wherein the selected symbol character is selected from the first sequence if a predetermined character string is not already present in the address field, and the selected symbol character is selected from the second sequence if the predetermined character string is already present in the address field.

22. The method of claim 21 wherein the selected non-text symbol character is selected both in dependence on the number of times the delimiter has been repetitively input without any intervening inputs and whether a predetermined symbol character is already present in the address field.

* * * * *